US010536269B2

(12) United States Patent
Dolev et al.

(10) Patent No.: US 10,536,269 B2
(45) Date of Patent: Jan. 14, 2020

(54) METHOD AND SYSTEM FOR AUTHENTICATION AND PRESERVING THE INTEGRITY OF COMMUNICATION, SECURED BY SECRET SHARING

(71) Applicant: SECRET DOUBLE OCTOPUS LTD, Beer-Sheva (IL)

(72) Inventors: Shlomi Dolev, Omer (IL); Shimrit Tzur-David, Mevaseret Zion (IL); Chen Tetelman, Tel Aviv (IL)

(73) Assignee: SECRET DOUBLE OCTOPUS LTD, Tel-Aviv (IL)

( * ) Notice: Subject to any disclaimer, the term of this patent is extended or adjusted under 35 U.S.C. 154(b) by 156 days.

(21) Appl. No.: 15/553,215

(22) PCT Filed: Feb. 24, 2016

(86) PCT No.: PCT/IL2016/050209
§ 371 (c)(1),
(2) Date: Aug. 24, 2017

(87) PCT Pub. No.: WO2016/135726
PCT Pub. Date: Sep. 1, 2016

(65) Prior Publication Data
US 2018/0241548 A1  Aug. 23, 2018

Related U.S. Application Data

(60) Provisional application No. 62/120,392, filed on Feb. 25, 2015.

(30) Foreign Application Priority Data

Oct. 12, 2015 (IL) .......................................... 242036

(51) Int. Cl.
| H04L 9/32 | (2006.01) |
| H04L 9/08 | (2006.01) |
| G06F 7/58 | (2006.01) |
| H04L 9/06 | (2006.01) |
| H04L 9/30 | (2006.01) |
| H04L 29/06 | (2006.01) |

(52) U.S. Cl.
CPC ................ *H04L 9/085* (2013.01); *G06F 7/58* (2013.01); *H04L 9/0656* (2013.01); *H04L 9/3026* (2013.01); *H04L 63/0428* (2013.01); *H04L 63/08* (2013.01)

(58) Field of Classification Search
None
See application file for complete search history.

(56) References Cited

U.S. PATENT DOCUMENTS

| 6,182,214 B1 | 1/2001 | Hardjono |
| 2003/0149869 A1 | 8/2003 | Gleichauf |
| (Continued) | | |

FOREIGN PATENT DOCUMENTS

WO   WO 2015177789   11/2015

OTHER PUBLICATIONS

International Search Report of Application No. PCT/IL2016/050209 dated Jun. 1, 2016.

*Primary Examiner* — Brandon S Hoffman
(74) *Attorney, Agent, or Firm* — Pearl Cohen Zedek Latzer Baratz LLP

(57) ABSTRACT

A system and method for providing secure communication between a source and a destination that is secured by secret sharing, during a vulnerability window in which all secret shares are collected in one or more points along the communication paths. Accordingly, during the regular operation of the communication protocol, a common random secret OTP is created by sending random bits from the sender to the receiver and the source is allowed to perform bitwise XOR operation between the information to be sent and the common random secret OTP, prior to using secret sharing. The results of the bitwise XOR operation are sent to the destination using secret sharing and the destination reconstructs the random secret and decrypts the received data, using the common established random secret. The common random (Continued)

secret is based on polynomial randomization being transferred from the source to the destination using secret sharing. The coefficients of a selected polynomial are randomly chosen at the sender side and are known both to the sender and the receiver. An x value is selected for each set of chosen coefficients, for which there is a corresponding y value. Pairs of x and y values transmitted from the sender to the receiver, where each pair represents a secret share. The transfer of polynomial randomization is repeated for every bit/byte or for any group of bits of the message to be transmitted, while in each time randomly choosing a different set of coefficients. At the end, the destination decrypts the message by collecting all shares being pairs of the received x and y values and reconstructs the selected polynomial from all collected shares.

16 Claims, 2 Drawing Sheets

(56) References Cited

U.S. PATENT DOCUMENTS

| | | |
|---|---|---|
| 2004/0117649 A1 | 6/2004 | Whyte |
| 2008/0144836 A1 | 6/2008 | Sanders et al. |
| 2009/0144543 A1 | 6/2009 | Fuje et al. |
| 2009/0185677 A1 | 7/2009 | Bugbee |
| 2011/0200188 A1* | 8/2011 | Ghouti .................... G06F 7/725 380/43 |
| 2016/0248586 A1* | 8/2016 | Hughes ................. H04L 9/0852 |
| 2017/0141918 A1* | 5/2017 | Dubrova .................. H04L 9/14 |

* cited by examiner

METHOD AND SYSTEM FOR AUTHENTICATION AND PRESERVING THE INTEGRITY OF COMMUNICATION, SECURED BY SECRET SHARING

CROSS-REFERENCE TO RELATED APPLICATIONS

This application is a National Phase Application of PCT International Application No. PCT/IL2016/050209, International Filing Date Feb. 24, 2016, entitled "Method and System for Authenticating and Preserving the Integrity of Communication, Secured by Secret Sharing", published on Sep. 1, 2016 as International Patent Publication No. WO2016/135726, claiming the benefit of U.S. Provisional Patent Application No. 62/120,392, filed Feb. 25, 2015 and claiming priority of Israeli Application No. 242036, filed on Oct. 12, 2015, all of which are hereby incorporated by reference.

FIELD OF THE INVENTION

The present invention relates to the field of communication networks, such as the Internet. More specifically, the present invention is related to a method and system for authenticating and preserving the integrity of communication between parties that is secured by secret sharing, even during a vulnerability window in which all secret shares are collected in one or more points along the communication paths.

BACKGROUND OF THE INVENTION

Secret-sharing is a tool used in many cryptographic protocols. Secret-sharing schemes have numerous applications in cryptography and distributed computing including secure information storage, secure multiparty computations, access control and more. A secret-sharing scheme involves a dealer who has a secret, a set of n parties, and a collection of subsets of k parties. According to a secret-sharing scheme, the dealer distributes shares to the parties such that any subset of k parties can reconstruct the secret from its shares, and any subset with less than k parties cannot reveal any partial information on the secret.

PCT/IL2015/050528 discloses a method for establishing a secure interconnection between a source and a destination over a public infrastructure using secret sharing (such as the secret sharing method described in "How to Share a Secret", A. Shamir, Communications of the ACM, No. 11, Vol. 22, or equivalent methods). According to this method a plurality of intermediating nodes are deployed in different locations over the network, to create a plurality of fully or partially independent paths in different directions on the path from the source to the destination, and with sufficient data separation. Then, the shares are sent over the plurality of fully or partially independent paths while forcing shares' carrying packets to pass through selected intermediate nodes, such that no router at any intermediating nodes intercepts sufficient shares to reveal the secret. The basic assumption is that there is no sniffing of data on all communication paths at the same time, and therefore, data transmission over the separated paths secure.

However, there are situations when such a separation cannot be guaranteed and the secret shares may pass via a single country or location, such that sniffing all the transmitted shares is possible. For example, even though backup paths (communication lines) are used for keeping such a separation, there are time periods when some backup paths will be down for maintenance purposes. As a result, these time periods will be "vulnerability time windows", during which the data transfer will not be secure.

One way of obtaining secure data transfer without using cryptographic keys (signed by a trusted Certification Authority) is to use secret shares in a form of points on randomly defined polynomial with a (free) coefficient being the secret. In this case, the source randomly selects bits that are actually transmitted, which correspond to values (x,y) on a polynomial which is unknown to the destination. The destination, which receives the transmitted values (x,y), can use extrapolation to reconstruct the polynomial that is selected by the source which defines the values (x,y), and find the secret (typically represented by the free coefficient of the polynomial) and additional genuine random bits used by the source to define the other coefficient(s) of the polynomial.

Another aspect to be solved for using secret sharing for communication between parties is authentication, since the identity of the destination which is authenticated at a particular transmission time, e.g., by coupling the party with IP/MAC address or other identity, at some (starting) point may not be valid afterwards, and if not valid in any point including the very first point of the communication (due to for example, IP spoofing) then communication should stop and cannot be understood by any other entity.

An additional problem relates to the integrity of the transmitted data, since a sniffing attacker may intercept secret shared transmission and inject/replace one or more data packets with other packets along paths from source to destination. In this case, if the attacker who changes the packets corrects its CRC according to the requirements of the transmission protocol, as well, it will be very hard to detect such corruption made to the transmitted data and therefore, as the (reconstructed from secret shares) message received at the destination may be corrupted in an undetectable way.

It is therefore an object of the present invention, to provide schemes for accumulating an OTP by the sender and the receiver using genuine randomization produced by the parties and the random polynomial used for secret sharing and/or genuine random bits sent as part of message padding.

It is another object of the present invention, to provide a method and system for keeping continuous secure communication between parties that is based on secret sharing, even if all secret shares are collected in one or more points along the communication paths for a certain bounded period of time (during which communication security is vulnerable to all secret shares sniffing).

It is another object of the present invention, to provide a method and system for authenticating communication between parties that is secured by secret sharing, even during a vulnerability window when all secret shares are collected in one or more points along the communication paths.

It is a further object of the present invention, to provide a method and system for continuously detecting the integrity of data exchanged between source and destination that is based on secret sharing, even during a vulnerability window when all secret shares are collected in one or more points along the communication paths.

Other objects advantages of the present invention will become clear as the description proceeds.

SUMMARY OF THE INVENTION

The present invention is directed to a method for providing secure communication between a source and a destination that is secured by secret sharing, during a vulnerability window in which all secret shares are collected in one or more points along the communication paths. Accordingly, during the regular operation of the communication protocol, a common random secret OTP is created by sending random bits from the sender to the receiver and the source is allowed to perform bitwise XOR operation between the information to be sent and the common random secret OTP, prior to using secret sharing. The results of the bitwise XOR operation are sent to the destination using secret sharing and the destination reconstructs the random secret and decrypts the received data, using the common established random secret. The common random secret is based on polynomial randomization being transferred from the source to the destination using secret sharing, by:

a) randomly choosing the coefficients of a selected polynomial at the sender side, which are revealed to the receiver when sufficient number of shares arrive to the receiver side, and then are known both to the sender and the receiver.
  b) for each set of chosen coefficients, selecting an x value and obtaining a corresponding y value of the selected polynomial;
  c) transmitting pairs of x and y values from the sender to the receiver, where each pair represents a secret share;
  d) repeating the transfer of polynomial randomization for every bit/byte or for any group of bits of the message to be transmitted, while in each time randomly choosing a different set of coefficients; and
  e) allowing the destination to decrypt the message by collecting all shares being pairs of the received x and y values and reconstructing the selected polynomial from all collected shares.

The method may further comprise the following steps:

a) randomly choosing the coefficients of a selected polynomial at the sender side, which are revealed to the receiver when sufficient number of shares arrive to the receiver side;
  b) creating an accumulated identical pool of random strings based on the randomization created by the sender and acknowledgments of the receiver;
  c) during communication, accumulating common random strings originated from randomly selected polynomial coefficients randomly selected by the sender, and when sufficient secret shares arrive to the sender, said coefficients are known only to the sender and the receiver;
  d) performing XOR operation of the data to be sent with a random string being a function of the collected random strings over the preceding windows, thereby using the past accumulated randomization, while creating new randomization; and
  e) constantly and seamlessly sending data during any time bounded vulnerability window, using the accumulated randomization.

Randomization produced from a random generator may be sent as part of the entire payload of a message using secret sharing, to thereby pad message(s) to be transmitted from the sender to the receiver and vice versa using control and random bits.

The accumulated randomization may be used to determine virtual points defining a polynomial of a higher degree than the degree of a polynomial that is defined by the sent secret shares being agreed upon both by the sender and the receiver. The secret shares (that when combined with said virtual points, define the secret) are then sent along with the virtual points, alternatively or in combination with a definition of the x values of the virtual points, according to coordinates from the accumulated randomization.

The virtual points may not be transmitted, such that the number of (x,y) points that are transmitted is not sufficient for reconstructing the polynomial of a higher degree.

The accumulated randomization may be used to define virtual coefficients, based on a polynomial of a higher degree that is defined by the secret shares that are sent and being agreed upon both by the sender and the receiver. Virtual points and coefficients may be continuously changed, according to a scheme agreed upon both by the sender and the receiver, where the virtual points and coefficients are transmitted using secret sharing or are not transmitted but agreed upon between the sender and the receiver.

The x coordinates may be continuously changed according to a predetermined pattern known only to the sender and the receiver, while sending only the y coordinates using secret sharing.

The present invention is also directed to a method for maintaining the authentication of the communication between parties that is secured by secret sharing during a vulnerability window when all secret shares are collected in one or more points along the communication paths, which comprises the following steps:

a) authenticating the sender to the receiver and vise-versa using the initial shared common secret as a common seed for pseudorandom sequence or a common OTP, thereby ensuring that only the receiving side be able to encrypt the received secret shared messages and vise-versa, using the initial identification for authenticating the messages during the entire communication time.
  b) authenticating the sender to the receiver and vise-versa using the initial shared initial common secret as a common seed for pseudorandom sequence or a common OTP, thereby ensuring that only the receiving side be able to encrypt the received secret shared messages and vise-versa, based on the initial identification for authenticating the messages during the entire communication time.

The pseudo random sequence may be used both by the sender and the receiver, to define each x coordinate of each secret share in a coordinated version, or the value of virtual points and/or coefficients. Then the common seed is repeatedly replaced by a new randomly chosen sequence obtained in the sender side or in the receiver side and the common seed may be sent as the payload of a message. The process is repeated on every bit/byte or any group of bits of the transmitted data during the entire data transmission session, where each session begins after establishing an initial common seed.

The present invention is also directed to a method for monitoring the integrity of data exchanged during communication between source and destination that is based on secret sharing, which comprises the following steps:

a) generating a signature of the payload, the signature is placed in a prefix, suffix, or at any other place(s) of the payload;
  b) performing secret sharing on the obtained signature and payload combination to form a new payload and to obtain a plurality of secret share packets for the new payload;
  c) sending each packet with an error detection mechanism;
  d) at the receiver side, using the packets with the shares to reconstruct the new payload that combines the original payload and the signature of the original payload and verifying that the original payload part in the reconstruction implies the signature part in the reconstruction.

The signature may be the CRC of the payload, XORed with a cryptographic hash-function of the payload.

The common random secret may be a one-time-pad being a random bit string created at the sender side, for allowing performing XOR operation between the information to be sent prior to using secret sharing; sending the XOR results to the destination, using secret sharing; allowing the destination to reconstruct the secret using a similar XOR operation with the shared accumulated bit string(s) that forms the synchronized one-time-pad.

The common secret may be randomly created, using a hardware or software-based pseudo random generator. The initial common random secret may be created using one or more of the following:
  a) identification of the communicating parties, which is established through several separated links being social media or public directories;
  b) initiating multipath communication for sending secret shares of a random string(s) rather than sending data; and
  c) sending each message along with additional random bits, for future use.

The sender may send secret shares from different sources, and/or asynchronously sends secret shares of the same OTP or message from different geographic locations to the same receiver, being identified by a single address or represented by several unlikable addresses, thereby constructing a common OTP, usable to encrypt later messages sent from a sender to a receiver in a perfectly secure manner.

The present invention is also directed to a method for creating and maintaining a bounded pool of synchronized random bits exchanged between a sender and a receiver during being in communication over a data network, comprising the following steps:
  at the sender side:
  a) producing random bits (RND) and using at least a part of the random bits as a seed for a Pseudo Random Sequence (PRS);
  b) performing XOR operation of the Pseudo Random Sequence with the PlainText (PT) to be encrypted, to obtain a XOR(PRS,PT) sequence;
  c) using a hash function (which may be cryptographic, using at least a part of the bits in RND) on the XOR(PRS,PT) sequence to produce a shorter sequence;
  d) performing XOR operation of the shorter sequence and the produced random bits, thereby forming XOR(hash (XOR(PRS,PT),RND);
  e) encrypting the message by concatenating the resulting XOR(hash(XOR(PRS,PT),RND) and XOR(PRS,PT).

The encrypted massage may be transmitted using secret sharing.

The resulting XOR(hash(XOR(PRS,PT),RND) may be used as the Initialization Vector of the Advanced Encryption Standard (AES).

The random bits may be sent over one or more channels of the data network, as part of the encrypted message, or as part of the standard random bits that are transmitted.

The control headers of the transmitted shares may be hidden using secret sharing, based on a randomly selected polynomial by:
  a) using secret sharing with a new and different polynomial, independent to the polynomial that is used to split and combine the data;
  b) the sender and the receiver share a common key and n−1 random points in the surface (n=k which is the threshold of the new polynomial);
  c) before splitting the data, the sender generates a true random number to be the n'th point (x,y) on the new polynomial;
  d) reconstructing the new and different polynomial and selecting its free coefficient as the ID of the block of shares;
  e) for each share that the sender sends, generating another true random number R;
  f) encrypting the another true random number R with the common key
  g) using the encrypted value as a seed to a Pseudo Random Number Generator (PRNG) to generate one value to be the x value;
  h) calculating the polynomial value, y, for this x value;
  i) the sender sends each share, such that the sent share contains the true random number R and the calculated y value;
  j) the receiver gets R, decrypts it with the common key, and uses R as a seed to a PRNG, to generate the x value;
  k) calculating the n'th point according to the corresponding y value;
  l) reconstructing the polynomial using the n'th point, to thereby obtain the free coefficient which is the common ID, wherein all the shares created from the same data and belonging to the same block are calculated using the same new and different polynomial and having the same ID.

In addition, for one or more intermediate destinations along the routing path from source to the final destination may be hidden using secret sharing and based on a randomly selected polynomial, by:
  a) defining routing stations along the path, in which the next intermediate destination changes;
  b) sharing one or more secrets between selected routing stations, such that the sender side will be a routing station and the receiver side will be the next routing station, wherein each routing station defines the next routing station and change the header accordingly.

The present invention is also directed to a method for creating and maintaining a bounded pool of synchronized random bits exchanged between a sender and a receiver during being in communication over a data network, comprising the following steps:
  d) accumulating in the pool, an OTP being a collection of common random strings of bits, transmitted during communication, originally sourced from randomly chosen polynomial coefficients revealed only to the sender and the receiver;
  e) obtaining forward and backward secrecy by XORing the recently used and the next to be used portions of the pool with new arriving random bits, such that pool leakage will not disclose the random bits to be used;
  f) continuously, or during any period suspected to be a vulnerability window, using previously accumulated shared random bits; and
  g) maintaining the transmitted OTP by applying XOR operation with the new common created random bits, and/or synchronously using permutation defined by parts of the current OTP to permute the bits of the OTP, using holographic schemes, in which any bit of the new OTP has a significant probability to be defined by every bit of the previous OTP, while being as less as possible correlated with other bits in the new OTP.

The present invention is also directed to a data network in which communication between a source and a destination that is secret shared, is secured during a vulnerability window, comprising:
- a) a processing unit for:
  - a.1) creating a common random secret OTP during the regular operation of the communication protocol, by sending random bits from the sender to the receiver;
  - a.2) performing at the source, bitwise XOR operation between the information to be sent and the common random secret OTP, prior to using secret sharing;
  - a.3) sending the results of the bitwise XOR operation to the destination using secret sharing;
  - a.4) at the destination, reconstructing the random secret and decrypting the received data, using the common established random secret;

The common random secret is based on polynomial randomization being transferred from the source to the destination using secret sharing, by;
- b) randomly choosing the coefficients of a selected polynomial which are known both to the sender and the receiver;
- c) for each set of chosen coefficients, selecting an x value and obtaining a corresponding y value of the selected polynomial;
- d) transmitting pairs of x and y values from the sender to the receiver, where each pair represents a secret share;
- e) repeating the transfer of polynomial randomization for every bit/byte or for any group of bits of the message to be transmitted, while in each time randomly choosing a different set of coefficients; and
- f) allowing the destination to decrypt the message by collecting all shares being pairs of the received x and y values and reconstructing the selected polynomial from all collected shares.

The present invention is also directed to a data network in which the authentication of the communication between a source and a destination that is secret shared, is secured also during a vulnerability window, comprising:
- a) a processing unit for:
- b) sharing an initial common secret between the sender and the receiver by exchanging messages through different identity authorities or via an out-of-band channel(s);
- c) authenticating the sender to the receiver and vise-versa using the initial shared common secret as a common seed for pseudorandom sequence or a common OTP, thereby ensuring that only the receiving side be able to decrypt the received secret shared messages and vise-versa, using the initial identification as a base for authenticating the messages during the entire communication time.

The present invention is also directed to a data network, in which the integrity of data exchanged between source and destination is monitored during secret shared communication, comprising:
- a) a processing unit for:
- b) generating a signature of the payload, the signature being regarded in a prefix, suffix, or at any other place(s) of the payload;
- e) performing secret sharing on the obtained signature and payload combination to form a new payload and to obtain a plurality of secret share packets for the new payload;
- f) sending each packet with an error detection mechanism;
- g) at the receiver side, using the packets with the shares to reconstruct the new payload that combines the original payload and the signature of the original payload and verifying that the original payload part in the reconstruction implies the signature part in the reconstruction.

The present invention is also directed to a system for creating and maintaining a bounded pool of synchronized random bits exchanged between a sender and a receiver during being in communication over a data network, comprising:
- a) a processing unit and memory for:
  - a.1) accumulating in the pool, an OTP being a collection of common random strings of bits, transmitted during communication, originally sourced from randomly chosen polynomial coefficients revealed only to the sender and the receiver;
  - a.2) using previously accumulated shared random bits during any period suspected to be a vulnerability window (or continuously, and seamlessly assuming that every window is vulnerable); and
- b) maintaining the transmitted OTP by applying XOR operation with the new common created random bits, and/or synchronously using permutation defined by parts of the current OTP to permute the bits of (possibly, other parts of) the OTP, using holographic schemes, in which any bit of the new OTP has a significant probability to be defined by every bit of the previous OTP, while being as less as possible correlated with other bits in the new OTP.

DETAILED DESCRIPTION OF THE INVENTION

Figure 1:
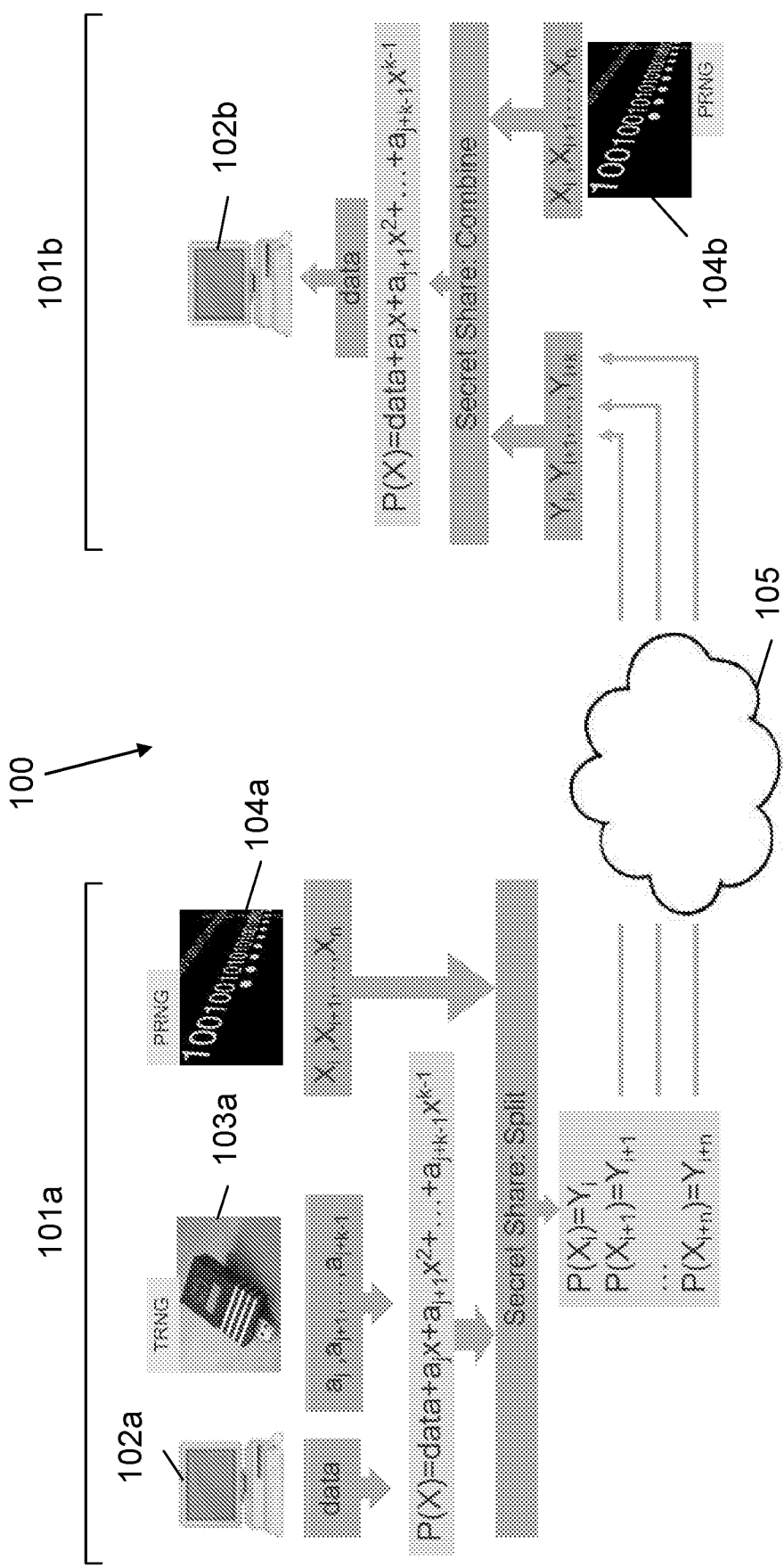
FIG. 1 illustrates an example of a system for providing secret shared communication over a data network, between a source and a destination that is secured even during a vulnerability window.

The present invention proposes a novel method for authenticating and preserving the integrity of communication between parties that is secured by secret sharing, even during a vulnerability window in which all secret shares are collected in one or more points along the communication paths, via which shares of the same secret are sent from source to destination.

According to one embodiment, the proposed method that uses a common random secret which may be initially given, initially established by any mean (e.g., resulting from the authentication procedure that uses several factor authentication according to PCT/IL2015/050528, or even using PKI based schemes) or may be gained over time, for allowing (whenever desired) performing XOR operation between the (clear-text) information to be sent and the common random secret. In this case, during the regular operation of the communication protocol a common random secret one-time-pad (OTP—being a random bit string) is created in the background by sending, random bits from the sender to the receiver using secret sharing. As a result, only the destination can reconstruct this secret one-time-pad, in order to be later used to decrypt the received data that will be sent using (bitwise, bit by bit, XOR, with) the common established one-time-pad. Once the destination has the one-time-pad, the sender performs a bitwise (bit by bit) XOR operation between the payload data and the random bit string (to obtain encryption of the clear-text payload data). Then, the payload data, encrypted by the produced one-time-pad, is sent over to the destination, using secret shares over multiple logical (e.g. a VPN) or physical channels, or on a single channel.

In another embodiment, a sender sends secret shares from different sources, say by purchasing prepaid SIM cards, and/or (asynchronously) sending secret shares of the same OTP (or message) from different geographic locations to the same receiver from different geographic locations, whether the receiver is identified by a single address or represented by several (possibly publicly unlikable) addresses. Each of the different locations that participate in the OTP transmission of the sources and destinations can be agreed prior to, or after the actual communication. Then, the constructed common OTP can be used to encrypt later messages sent from a sender to a receiver in a perfectly secure manner. The benefit being the difficulty to trace all messages sent from many different senders to many different receivers.

According to another embodiment of the proposed method, the initial common random secret may be created using identification of the communicating parties, which is established through several links (such as social media, public directories, and alike) as means for establishing an initial shared random secret. Alternatively, the initial common random secret may be established by initiating multi-path communication for sending secret shares of a random string(s) (rather than sending data). In addition, each message may be sent along with padding of genuine random bits, to be used in the future as means for overcoming (possible) future vulnerable period.

Alternatively, other protecting means may be employed, e.g., using a hardware or software-based pseudo-random generator (or, possibly XOR, or another combination of them), for producing a sequence of random bits which is common to the sender and the receiver.

A common existing scheme for encrypting a message to be sent from source to destination is using a polynomial encryption, where the message is converted into a numerical value and encrypted by the sender using a selected polynomial of a predetermined degree with predetermined coefficients e.g., in the form of $$a_n x^n + a_{n-1} x^{n-1} + \ldots + a_0.$$

FIG. 1 illustrates an example of a system for providing secret shared communication over a data network, between a source and a destination that is secured even during a vulnerability window. The system 100 comprises a sender side 101a, which includes a computerized device 102a (source), which should send data to a second computerized device 102b using the secret sharing scheme proposed by the present invention, which according to one embodiment, is based on a randomly selected polynomial P(x) of degree k−1.

$$a_{j+k-1} x^{k-1} + \ldots + a_j x + a_0 = P(x)$$

Where $a_0$ is the data to be sent (the secret).

A True Random Number Generator 103a (TRNG—a hardware device that generates random numbers from a physical process, rather than a computer program) is used to randomly select k−1 coefficients, $a_j, a_{j+1}, \ldots, a_{j+k-1}$ (j is an index of the TRNG). A Pseudo Random Number Generator 104a (PRNG—a pseudorandom number generator (PRNG—a deterministic random bit generator that generates by software a sequence of numbers whose properties approximate the properties of sequences of random numbers) is used to randomly select n points $X_i, X_{i+1}, \ldots, X_n$ on the polynomial (i is an index of the PRNG) which are used by computerized device 102a to calculate their corresponding n Y values $Y_i, Y_{i+1}, \ldots, Y_n$ on the polynomial P(x). This way, the data to be sent is split at the sender side 101a to n shares, where each share corresponds to a Y value. All $Y_i, Y_{i+1}, \ldots, Y_n$ are sent via the data network 105.

The system 100 comprises a receiver side 101b, which includes a computerized device 102b (destination), which should collect at least k shares (k<n) to reconstruct the data ($a_0$) by calculating the polynomial P(x). A similar Pseudo Random Number Generator 104b is used to generate the same randomly selected n points $X_i, X_{i+1}, \ldots, X_n$ on the polynomial. Computerized device 102b collects at least k shares which are the points $Y_i, Y_{i+1}, \ldots, Y_{i+k}$ on the polynomial P(x) and combines them. Therefore, P(x) can be reconstructed with all its coefficients, including $a_0$ which is the sent secret.

For example, if the message is the word "CAR", each letter may get a numerical value according to its appearing order in the English alphabet, (where "A" is converted into the value "1", B into "2" and so forth, until Z into "26"), such that "CAR" is represented by say three random polynomials (if every polynomial encodes one character).

If the first randomly selected polynomial that encodes the secret 3 as its free coefficient to reflect the character "C" is:

$$P(x)=2x^4+3x^3+x^2+4x+3,$$

then the part of the message that represents "C" will be secret shared to at least five points (x,y) on P(x), say (2,71), (1,13), (5,1673), (11, 33443) (8,9827).

In fact, the messages are encrypted sequentially, even bit by bit, where all computations are done in a finite field.

Decryption by sniffing all the paths becomes impossible when a higher degree polynomial is selected for performing the encryption, where only a subset of its coefficients are randomly chosen and the rest are predetermined, and possibly in combination with some points of the polynomial that are predetermined in a coordinated manner. Coordination is obtained by using the same predetermined values (unknown to the sniffers) in a synchronized fashion both by the sender and the receiver, thereby defining the chosen polynomial to be a polynomial of a higher degree than a polynomial that can be reconstructed by the actual points sent from the sender to the receiver (points that are required for reconstructing the polynomial). As a result, only the receiver can decrypt the message.

In turn, while not allowing the sniffers to reveal the communication, still the sender and the receiver can continue accumulating genuine random bits, from the (still) constantly varying randomization used in the secret sharing, which is transferred from the sender side to the receiver side. Such a randomization is made for every bit or byte (or any other quantity of bits) of the message to be transmitted.

According to an embodiment of the invention, long common random string during communication may be accumulated, possibly from the randomly chosen polynomial coefficients revealed only to the sender and the receiver, in order to create an accumulated identical pool of random strings, which constitute a type of accumulated randomization, to be used during (a possible) vulnerability window (where every period is suspected to be a vulnerability window), during which past shared accumulated random bits are used. Alternatively, or in addition, randomization produced from a (true) random generator may be sent as part of the (entire) payload of a message using secret sharing (i.e., sending randomization from side to side, rather than information only). This way, padding every message (e.g., adding a number of random characters at the beginning or the end of the message), using the fact that many transmission protocols use only part of the maximal packet length. Then when a packet is not full, additional characters can be filled in to be transmitted from the sender to the receiver and vice versa, along with random bits is possible, by using random bits and control bits (where control bits are used for example, to describe the padding length).

The long common random string is used to XOR the data to be sent, in a way that always uses a function of the collected random string from the past windows (i.e., the windows prior to the beginning of the current window time period), to encrypt the current window. This way, even if there is an undetected window of a predefined period of time (called, vulnerability window), within which all secret shares are collected, the data carried by the entire collection will remain secure, using this accumulated randomization.

It is known that a selected polynomial with randomly chosen coefficients may be reconstructed only if there is a sufficient number of points (x;y) received by the destination. A polynomial with higher degree requires more points to be reconstructed. According to an embodiment of the invention, the accumulated randomization may be used to define phantom (i.e., virtual) coefficients (a_i) and/or phantom points (x;y) and/or phantom x or y coordinates values of the points of the polynomial, agreed upon both by the sender and the receiver. Then a secret sharing scheme is used, based on a polynomial of a higher degree that is defined by the secret shares that are sent, along with the phantom coefficients/ points/x or y-coordinates values, mutually defined according to the coordinated accumulated randomization. In particular, these phantom polynomial coefficients, phantom points or phantom x or y coordinates values are not transmitted, so the number of (x;y) points or x or y coordinates values that are transmitted is not sufficient for reconstructing the (higher degree) polynomial.

Also, if both x and y point coordinate values (points on the selected polynomial that represent secret shares) are transmitted, a sniffer may associate the selected random coefficients with the transmitted values x and y. Therefore, there may be some unwanted knowledge revealed by the transmitted points about these coefficients. To solve this problem, it is possible to use both missing coefficients and missing points that are predetermined at both sides, so as to eliminate the possibility that a sniffer that collects all (or part of) the sent shares will be able to compute the polynomial, and reveal the secret (revealing the secret becomes impossible if before secret sharing, the secret pass a XOR operation with a true random string as approximated by accumulating of synchronized random pool of bits and possible holographic operations over the accumulated pool as described in the sequel).

When using one (or more) channel(s), randomization may be accumulated for building a pool of random bits which are common both to the sender and the receiver. This can be done by sending random bits as part of the encrypted message, or as part of the standard random bits that are transmitted to avoid deterministic encryption (a deterministic encryption a cryptosystem which always produces the same ciphertext for a given plaintext and key, even over separate executions of the encryption algorithm. Deterministic encryption can leak information to an eavesdropper, who may recognize known ciphertexts) and known plaintext attacks (the attacker has access to both the plaintext and its encrypted version, i.e., the ciphertext).

In one embodiment, the present invention proposes an efficient technique to avoid deterministic encryption and known plaintext attacks, where the sender produces random bits (RND) and uses them as a seed for a Pseudo Random Sequence (PRS). Then the sender performs XOR operation of the Pseudo Random Sequence with the PlainText (PT) to be encrypted, to form a XOR(PRS,PT) sequence. Then the sender uses a hash function on the XOR(PRS,PT) sequence, so as to gain a (relatively short) sequence to be XORed with the produced random bits, to form XOR(hash(XOR(PRS, PT),RND). Then the sender concatenates the resulting XOR (hash(XOR(PRS,PT),RND) and XOR(PRS,PT) to encrypt the message. The resulting XOR(hash(XOR(PRS,PT),RND) may be used for example, as the Initialization Vector (an arbitrary number that can be used along with a secret key for data encryption and is employed only one time in any session, to prevent repetition in data encryption) of the Advanced Encryption Standard (AES—a symmetric block cipher) to transmit to the receiver. Alternatively, secret sharing may be used for transmission. Once the receiver decrypts the message, he has to further compute (hash(XOR (PRS,PT)), then RND, then PRS then PT, in a conventional manner.

It is also possible to use the accumulated randomization to define phantom coefficients ($a_i$) of the polynomial agreed upon both by the sender and the receiver and use a secret sharing scheme, thereby defining a polynomial of a higher degree alternatively or in combination with a definition of the x coordinate values of the points, according to the coordinated accumulated randomization.

Phantom points and coefficients may be continuously changed according to a scheme agreed upon both by the sender and the receiver and may be transmitted using secret sharing or may not be transmitted at all (but agreed upon between the sender and the receiver). In any case, there will always be missing information concerning a point(s) or a missing coefficient(s) which are necessary for reconstructing the (higher degree) polynomial.

The present invention proposes several techniques for accumulating a common random secret (almost sure to be) One-Time-Pad (OTP—being a truly random bit string) by conveying true-random bits from a sender to a recipient in a managed and synchronized accumulation manner. This is done as part of the message payload using padding of the message to the maximal packet length, and/or by computing the randomly chosen coefficient(s) of a polynomial used in the process of secret sharing and/or by defining mutual, agreed upon, x value(s) for which the y values in the revealed polynomial are used as a source for accumulating random values.

This is an opportunity to accumulate genuine random bits produced by the sender that are actually and implicitly sent to the receiver, to be shared by sender and the receiver in a synchronized fashion. Over time, the accumulation of the same random bits by the source and destination can create a one-time pad (OTP, which is a sequence of random bits shared by the source and destination and used to perfectly securing the communication typically by XORing each bit of information with a bit in the OTP, where each bit in the OTP participates in encrypting at most one bit of the information to be transmitted) being common to the source and destination. The present invention suggests using these common random bits to overcome vulnerability windows of time during which all paths are sniffed. If all transmitting paths are sniffed, the attempt for accumulating a one-time pad needs to be performed cautiously, to avoid the construction of possible (future) breakable OTP.

For each time bounded vulnerability period, accumulated common randomization is used possibly from a nonce of the initial authentication process (that originally used to map the network identifier (such as IP/MAC address) or any other identifier in the network) to the communicating identities, but can also have long enough nonce, a portion of which used as a common agreed upon random string) or by accumulating randomization throughout the operations as described above. Upon transmitting information during a window of the length of the vulnerability period, both the sender and the receiver use randomization that has accumulated prior to the current window. The used accumulated randomization can be in the form of XORing the payload with portions of this OTP, computing a polynomial of higher degree than the degree implied by the points that are actually sent. The additional information required to compute the polynomial is agreed upon both by the sender and the receiver using the accumulated OTP, in the form of common coefficient(s), common point(s), common x value(s) of the point(s), where only y value(s) are sent or vice versa.

EXAMPLE

If two secret shares are sent for a polynomial of degree 3 given by:

$$P(x)=a_3x^3+a_2x^2+a_1x+a_0$$

where $a_0$ is the secret (which may be XORed), then four points (x;y) on the polynomial are needed to reveal the coefficients (and the XORed secret). Then, if there is an agreed upon phantom point (x=7;y=10) and phantom coefficient $a_2=3$ in both sides of the sender and the receiver, and only two secret shares (points on the polynomial) are sent by the sender, only the receiver who has the phantom point (x=7;y=10) and phantom coefficient $a_2=3$ will be able to reveal the polynomial P(x) and the secret. A sniffer who does not have the missing point (7;10) and coefficient value (3) will not be able to reveal them.

Therefore, only the sender and the receiver (the endpoints) who have the initial common secret (that can serve as a common seed for a pseudo random sequence) will be able to decrypt messages exchanged between them. Any other entity which sniffs the transmission paths for time limited vulnerability window will not be able to decrypt the message, even if he/she managed to collect all the transmitted bytes.

The number of possible combinations for the missing points and/or missing coefficients grows exponentially with the number of phantom points and phantom coefficients. Therefore, from the combinatorial point of view, security is maintained even when the clear text is the coefficient $a_0$ (rather than the XOR result of the secret with the shared randomization).

Whenever a message is transmitted by the sender, the sender uses a real random source to define all coefficients except for $a_0$, so the receiver receives enough secret shares to reveal all coefficients of the polynomial. Thus, there is transmission of inherent randomization from the sender to the receiver. This transmission of inherent randomization is used to keep the randomization extraction process uncorrelated with the plaintext and the subset of secret shared that have been sniffed by a potential intruder. A value of the randomly chosen polynomial may be used in a coordinated pseudo-randomly created x coordinates of the point(s).

Another possibility is to continuously change the x coordinates (values) according to a predetermined pattern known only to the sender and the receiver and to send only the y coordinates using secret sharing. This way, only the sender and the receiver (the endpoints) can know which x coordinate corresponds to any sent y coordinate, in order to decrypt the sent message. This way, the authentication established when connection starts is a rolling authentication throughout the communication, where the sender and the receiver continuously identify and authenticate themselves to each other.

There are several ways to maintain the transmitted genuine random bits conveyed to the receiver (almost) OTP, while using bounded memory for the accumulated OTP and still use all bits accumulated so far in defining the current OTP. According to one embodiment, every bit that participates in one version of the bounded OTP pool, takes part in defining the next version of the OTP pool, in a sense that resembles to holographic coding (i.e., a bit in the next OTP is a function of every bit of the previous OTP bits). Throughout the process, the sender conveys (and the receiver accumulates this) real randomization, where there is an equal probability for each conveyed (and agreed upon the sender and the receiver) random bit to be 0 and 1. Applying a random permutation to the OTP pool (i.e., reordering its elements) will keep the above equal probability. Assuming that the existing OTP is pure randomization, a sniffing potential intruder is unaware of any information about the collected randomization so far.

If COTPP represents the Current OTP Pool, and NR represents the New Randomization obtained from the genuine randomization used to define the additional coefficients (possibly using extra x values as described and/or XORing some of them) or as randomization being an extension of the message, as described above, then COTPP is modified in a synchronized fashion in both sides, in "a one message delay synchronization" fashion as in the Lempel Ziv scheme (a universal lossless data compression algorithm). For example, half prefix of NR is concatenated to the beginning of the COTPP and the half suffix of NR at the end of COTPP to obtain COTPP', use the first portion of COTPP' to define a permutation over the rest of COTPP' then use the permuted part as the pseudo-random-OTP for XORing the next message and phantom points, phantom x values and/or phantom coefficients. The permuted part are kept as the prefix part of COTPP', while moving it from the original suffix place it was taken from to the front. The procedure is repeated whenever new message is sent and received. A similar approach may be taken where NR is XORed sequentially to the already existing pool of randomization, while using the rest of non XORed pool, and once all pool is XORed or exhausted, repeatedly using the entire pool but one portion $prt_i$ of the pool at a time, to define some signature, e,g., CRC, and use it as a seed for producing a permutation of the bits of $prt_i$ into the left empty positions of a new pool.

Another possibility is to represent COTPP as a matrix and to use RN to rotate columns and rows and then perform XOR operation of RN with several values in COTPP or attach RN to COTPP.

Of course using Advanced Encryption Standard (AES) for random numbers generation and pseudo-randomness (classical) techniques can be incorporated, as well.

According to a further embodiment, authenticating the communication between parties that is secured by secret sharing is maintained even during a vulnerability window when all secret shares are collected in one or more points along the communication paths. Once a nonce (initial common secret) is shared by the sender and the receiver by means of exchanging messages through possibly different identity authorities or via an out-of-band (totally separated)

channel(s), the initial shared nonce is used to authenticate the sender to the receiver and vise-versa.

Accordingly, the common secret is used as a common seed for pseudorandom sequence, for ensuring that only the receiving side be able to encrypt the arriving (secret shared) messages and vise-versa, thereby ensuring the use of the initial identification as a base for authenticating the messages during the entire communication time. For example, both the sender and the receiver may use the pseudo random sequence to define each x coordinate of each secret share in a coordinated version, or the value of phantom points (x and/or y values in the polynomial coordinates) and/or phantom coefficients. The common seed can be repeatedly replaced by a new randomly chosen sequence obtained at the sender side or at the receiver side (or a function of random sequences from both) and sent as the payload of a message. This way, the possibility to identify the seed is dramatically reduced. In order to be sure who is the destination, this authentication process is performed continuously on every bit or byte of the transmitted data (message), during the entire data transmission session, where each session begins when there is already an initial common secret (seed). For beginning authentication (i.e., during authentication "handshake") the initial common secret may be gained using the method described in PCT/IL2015/050528 or alternatively, by giving a hardware token to coordinate a common seed. This continuous (ongoing) authentication process relies upon the initial authentication "handshake" process. The ongoing authentication process is used to couple the identity with common nonce and IP/MAC addresses. Once both identities share the same random string (which is a part of the nonce at the beginning of handshake process and later is the accumulated OTP as described above), the polynomial is always computed using phantom values, which may be any combination of one or more missing coefficients, points or coordinates of points. As a result, any encryption and decryption based on secret sharing involves ongoing identification of the endpoints.

According to a further embodiment, the integrity of data exchanged between source and destination that is based on secret sharing may be continuously monitored, even during a vulnerability window when all secret shares are collected in one or more points along the communication paths. In order to ensure that secret shares of a message are not replaced by packet injection that replace some of the shares or even all the shares, a signature on the payload may be used as part of the new payload, which is secret shared. The receiver then combines the shares at the destination and checks them to verify that the signature remained unchanged, to thereby identify injected or replaced packets. Such a signature may be the CRC of the payload, possibly XORed with a cryptographic hash function of the payload. The signature is then secret shared just like the payload. In fact, the signature may form the prefix, the suffix, or may be embedded in any other place(s) of the payload. The resulting concatenated sequence is secret shared, thereby resulting in several (secret shared) packets. Each packet is sent with an error detection mechanism (e.g., CRC) just as the common practice. The receiver side uses the packet with the shares to reconstruct the concatenated signature and payload and verifies that the payload implies the signature. Even if all packets are replaced, the unknown x values that are used for authentication will imply identification of integrity loss.

After collecting all packets at the destination and reconstructing the sent data, it will be possible to detect integrity faults. Upon such detection, the received data may be disregarded, and alternatively, other collected shares may be used.

In a further embodiment, secret sharing is also used to hide the control headers of the transmitted shares, such that the receiver will be able to identify shares that have been split from the same data and belong to the same secret sharing block (which usually corresponds to a data packet). This is essential, since the receiver should know which shares (among all the received shares) and in what order to combine, in order to reconstruct the sent data. Secret sharing is therefore used to hide the secret sharing control.

In this case, the header of each share includes an index of that share in the block (between 1 to n), and an ID, where all n shares of a block has a common ID. This common ID and the index should be hidden, such that even if a $3^{rd}$ party will have unlimited access to the data network, still it will be hard to know which shares to combine for reconstructing the data block and in what order. In order to achieve that, secret sharing is used again, with a different polynomial, independent to the polynomial that is used to split and combine the data. The sender and the receiver shares a key and n-1 random points in the surface (n=k which is the threshold of the new polynomial, defining the minimal number of shares required to be combined, for reconstructing the data). Before splitting the data, the sender generate a true random number to be the n'th point on the new polynomial (x and y), then it constructs the polynomial. The free coefficient of this polynomial is the ID of the block of shares. Now for each share that the sender sends, it generates another true random R, it encrypts it (e.g. by using a XOR operation) with the common key and it uses the encrypted value as a seed to a pseudo random number generator (PRNG) to generate one value to be the x value. Then it calculates the polynomial value, y, for this x value. Each share that the sender sends contains the true random number R and the calculated y value. The receiver gets R, decrypts it with the common key, and uses it as a seed to a PRNG to generate the x value, then, together with the y value it has the n'th point to construct the polynomial and get the free coefficient which is the common ID. All the shares of the same block (created from the same data) are calculated from the same polynomial and thus have the same ID.

In a further embodiment, secret sharing is also used to hide the index $1 \leq ID_x \leq n$ (representing the position) of the share within the block. At the sender side, after constructing the polynomial, the sender uses the free coefficient (or generates another true random r that is XORed with another common key) as a Key to a function f (e.g. seed to a PRNG) to create n random numbers, such that:

$$f(\text{Key}, 1) = r_1$$
$$f(\text{Key}, 2) = r_2$$
$$\vdots$$
$$f(\text{Key}, n) = r_n$$

The i'th share in the block that the sender sends contains $r_i$. When the receiver gets a share from a block, it constructs the Key (either by constructing the polynomial or by applying other function on a sent true random number) and generates $r_1$ to $r_n$. If $r_j$ is the hidden index in the share, then if $r_i = r_j$ then $ID_x = i$.

According to another embodiment, it is possible to hide one or more intermediate destinations (which are part of the header of each share, which determines the next destination) along the routing path from source to the final destination. This is done by defining routing stations along the path, in which the next intermediate destination changes, and sharing one or more secrets between selected routing stations, such that the sender side will be a routing station and the receiver side will be the next routing station, such that each routing station will define the next routing station and change the header accordingly.

Figure 2:
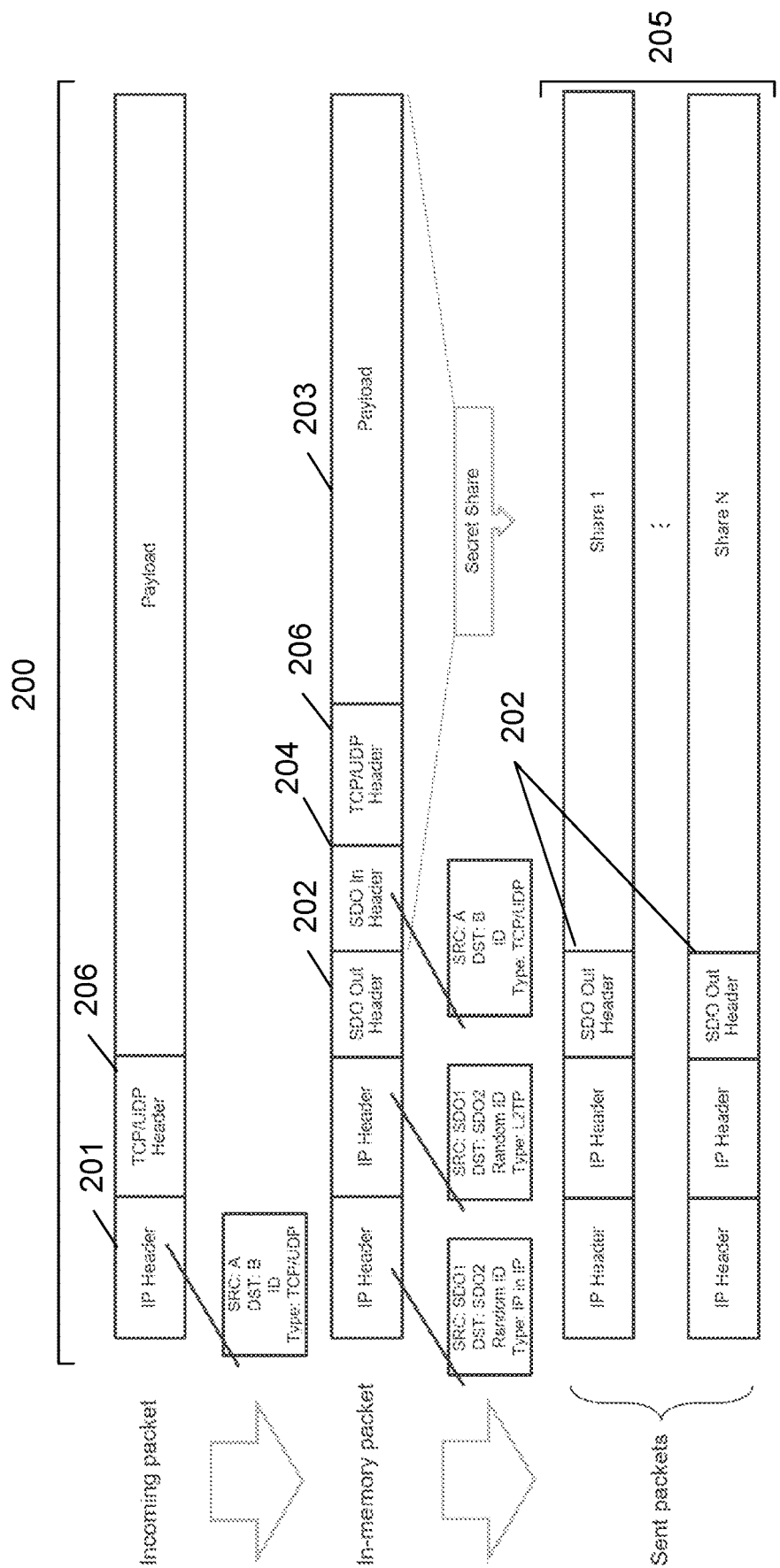
FIG. 2 illustrates the process of using secret sharing for creating hidden control headers of the transmitted shares.

FIG. 2 illustrates the process of using secret sharing for creating hidden control headers of the transmitted shares, such that only the receiver will be able to identify shares that have been split from the same data block.

The original packet 200 has its payload and headers (e.g., TCP/IP). For example, the packet is originated from source A and destine to B, it has an ID field of the IP header 201 and a type field that identify the protocol in the upper layer such as Transmission Control Protocol (TCP—used primarily for establishing low-latency and loss tolerating connections between applications on the Internet or User Datagram Protocol (UDP) is an alternative communications protocol. Both UDP and TCP run on top of the Internet Protocol (IP) and are sometimes referred to as UDP/IP or TCP/IP). At the first step, an IP tunneling protocol in the form of an IP-in-IP protocol is used to create another IP header (an IP tunneling protocol encapsulates one IP packet in another IP packet. To encapsulate an IP packet in another IP packet by adding an outer IP header, Source IP, the entry point of the tunnel and the Destination IP, the exit point of the tunnel). Hence, both source and destination addresses are changed to the addresses of virtual appliances placed at both edges of the tunnel (so as to force packets with modified outer header to pass via the tunnel) and the ID field is changed to a random number. The type field in the outer IP header is compatible with IP-in-IP protocol and the type field in the inner IP header 204 is compatible with any other networking protocol, such as Layer Two Tunneling Protocol (L2TP—an extension of the Point-to-Point Tunneling Protocol used by an Internet service provider to enable the operation of a virtual private network over the Internet). This way, all packets will look the same. At the next step, outer header 202 is added (this outer header 202 does not contain any secret data and therefore, is not secret shared). At the next step, an inner header 204 that contains the original fields (source and destination IP addresses, ID and type field) that were changed is added. At the next step, secret sharing is used to split the inner header 204, the upper protocol headers (e.g. TCP/UDP header 206) and the payload 203 to create N shares (205) to be sent.

FIG. 2 is a flow chart showing the steps of the method proposed by the present invention, according to one embodiment. As such, the operations of FIG. 2, when executed, convert a computer or processing circuitry into a particular machine configured to perform an example embodiment of the present invention. Accordingly, the operations of FIG. 2 define an algorithm for configuring a computer or processing circuitry (e.g., a processor) to perform an example embodiment. In some cases, a general purpose computer may be provided with an instance a processor, which performs the algorithm shown in FIG. 2 (e.g., via configuration of the processor), to transform the general purpose computer into a particular machine configured to perform an example embodiment.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for providing secure communication between a source and a destination that is secured by secret sharing, during a vulnerability window in which all secret shares are collected in one or more points along the communication paths, comprising:
   a) during the regular operation of the communication protocol, creating a common random secret OTP by sending random bits from the sender to the receiver;
   b) allowing said source performing bitwise XOR operation between the information to be sent and said common random secret OTP, prior to using secret sharing;
   c) sending the results of said bitwise XOR operation to the destination using secret sharing;
   d) allowing said destination to reconstruct said random secret and to decrypt the received data, using said common established random secret, wherein said common random secret is based on polynomial randomization being transferred from said source to said destination or sent as part of the payload using secret sharing, by:
      d.1) randomly choosing the coefficients of a selected polynomial at the sender side, which are revealed to the receiver when sufficient number of shares arrive to the receiver side, and then are known both to the sender and the receiver;
      d.2) for each set of chosen coefficients, selecting an x value and obtaining a corresponding y value of said selected polynomial;
      d.3) transmitting pairs of x and y values from said sender to said receiver, where each pair represents a secret share;
      d.4) repeating the transfer of polynomial randomization for every bit/byte or for any group of bits of the message to be transmitted, while in each time randomly choosing a different set of coefficients; and
      d.5) allowing said destination to decrypt said message by collecting all shares being pairs of the received x and y values and reconstructing said selected polynomial from all collected shares;
   e) creating an accumulated identical pool of random strings based on the randomization created by the sender;
   f) transferring polynomial randomization from source to destination and vice versa using secret sharing;
   g) performing XOR operation of the data to be sent with a random string being a function of the collected random strings over the preceding windows, thereby using the past accumulated randomization, while creating new randomization; and
   h) constantly and seamlessly sending data during any time bounded vulnerability window, using said accumulated randomization.

2. A method according to claim 1, further comprising sending randomization produced from a random generator as part of the entire payload of a message using secret sharing, thereby padding message(s) to be transmitted from the sender to the receiver and vice versa using control and random bits.

3. A method according to claim 1, further comprising:
a) using the accumulated randomization to determine virtual points defining a polynomial of a higher degree than the degree of a polynomial that is defined by the sent secret shares being agreed upon both by the sender and the receiver;
b) sending said secret shares with said virtual points, alternatively or in combination with a definition of the x values of said virtual points, according to coordinates from said accumulated randomization, said secret shares, when combined with said virtual points, define the secret.

4. A method according to claim 1, further comprising using the accumulated randomization to define virtual coefficients, based on a polynomial of a higher degree that is defined by the secret shares that are sent and being agreed upon both by the sender and the receiver.

5. A method according to claim 1, further comprising continuously changing virtual points and coefficients, according to a scheme agreed upon both by the sender and the receiver, where said virtual points and coefficients are transmitted using secret sharing or are not transmitted but agreed upon between the sender and the receiver.

6. A method according to claim 1, further comprising:
a) continuously changing the x coordinates according to a predetermined pattern known only to the sender and the receiver; and
b) sending only the y coordinates using secret sharing.

7. The method of claim 1 further adapted to maintain the authentication of the communication between parties that is secured by the secret sharing during a vulnerability window when all secret shares are collected in one or more points along the communication paths, comprising:
a) sharing an initial common secret between the sender and the receiver by exchanging messages through different identity authorities or via an out-of-band channel;
b) authenticating the sender to the receiver and vise-versa using the initial shared initial common secret as a common seed for pseudorandom sequence or a common OTP, thereby ensuring that only the receiving side be able to encrypt the received secret shared messages and vise-versa, using the initial identification as a base for authenticating the messages during the entire communication time.

8. A method according to claim 7, comprising:
a) using the pseudo random sequence both by the sender and the receiver, to define each x coordinate of each secret share in a coordinated version, or the value of virtual points and/or coefficients;
b) repeatedly replacing the common seed by a new randomly chosen sequence obtained in the sender side or in the receiver side;
c) sending said common seed as the payload of a message;
d) repeating the preceding steps on every bit/byte or any group of bits of the transmitted data during the entire data transmission session, where each session begins when there is already an initial common seed.

9. A method according to claim 1, wherein the paths are predetermined, or defined per each share on the fly.

10. A method according to claim 1, wherein the common random secret is a onetime-pad being a random bit string created at the sender side, for allowing:
a) performing XOR operation between the information to be sent prior to using secret sharing;
b) sending the XOR results to the destination, using secret sharing;
c) allowing said destination to reconstruct the secret using a similar XOR operation with the shared accumulated bit string(s) that forms the synchronized one-time-pad.

11. A method according to claim 1, wherein the common secret is randomly created using a hardware or software-based pseudo random generator.

12. A method according to claim 1, wherein the initial common random secret is created using one or more of the following:
a) identification of the communicating parties, which is established through several separated links being social media or public directories;
b) initiating multipath communication for sending secret shares of a random string(s) rather than sending data; and
c) sending each message along with additional random bits, for future use.

13. A method according to claim 1, wherein the sender sends secret shares from different sources, and/or asynchronously sends secret shares of the same OTP or message from different geographic locations to the same receiver, being identified by a single address or represented by several unlikable addresses, thereby constructing a common OTP, usable to encrypt later messages sent from a sender to a receiver in a perfectly secure manner.

14. A method according to claim 1, further comprising using secret sharing, based on a randomly selected polynomial, for hiding the control headers of the transmitted shares, by:
a) using secret sharing with a new and different polynomial, independent to the polynomial that is used to split and combine the data;
b) the sender and the receiver share a common key and n−1 random points in the surface (n=k which is the threshold of the new polynomial); c) before splitting the data, the sender generates a true random number to be the n'th point (x,y)on said new polynomial;
d) reconstructing said new and different polynomial and selecting its free coefficient as the ID of the block of shares;
e) for each share that the sender sends, generating another true random number R;
f) encrypting said another true random number R with the common key g) using the encrypted value as a seed to a Pseudo Random Number Generator (PRNG) to generate one value to be the x value;
h) calculating the polynomial value, y, for this x value;
i) the sender sends each share, such that the sent share contains the true random number R and the calculated the y value;
j) the receiver gets R, decrypts it with said common key, and uses R as a seed to a PRNG, to generate the x value;
k) calculating the n'th point according to the corresponding y value;
l) reconstructing the polynomial using said n'th point, to thereby obtain the free coefficient which is the common ID,
wherein all the shares created from the same data and belonging to the same block are calculated using the same new and different polynomial and having the same ID.

15. A method according to claim 1, further comprising using secret sharing, based on a randomly selected polynomial, for hiding one or more intermediate destinations along the routing path from source to the final destination, by:
c) defining routing stations along said path, in which the next intermediate destination changes;

d) sharing one or more secrets between selected routing stations, such that the sender side will be a routing station and the receiver side will be the next routing station, wherein each routing station defines the next routing station and change the header accordingly.

16. A data network in which communication between a source and a destination that is secret shared, is secured during a vulnerability window, comprising:

c) a processing unit for:
   a.1) creating a common random secret OTP during the regular operation of the communication protocol, by sending random bits from the sender to the receiver;
   a.2) performing at said source, bitwise XOR operation between the information to be sent and said common random secret OTP, prior to using secret sharing;
   a.3) sending the results of said bitwise XOR operation to the destination using secret sharing;
   a.4) at said destination, reconstructing said random secret and decrypting the received data, using said common established random secret;

wherein said common random secret is based on polynomial randomization being transferred from said source to said destination or sent as part of the payload, using secret sharing, by:

d) randomly choosing the coefficients of a selected polynomial which are known both to the sender and the receiver;

e) for each set of chosen coefficients, selecting an x value and obtaining a corresponding y value of said selected polynomial;

f) transmitting pairs of x and y values from said sender to said receiver, where each pair represents a secret share;

g) repeating the transfer of polynomial randomization for every bit/byte or for any group of bits of the message to be transmitted, while in each time randomly choosing a different set of coefficients;

h) allowing said destination to decrypt said message by collecting all shares being pairs of the received x and y values and reconstructing said selected polynomial from all collected shares;

i) creating an accumulated identical pool of random strings based on the randomization created by the sender;

j) transferring polynomial randomization from source to destination and vice versa using secret sharing;

k) performing XOR operation of the data to be sent with a random string being a function of the collected random strings over the preceding windows, thereby using the past accumulated randomization, while creating new randomization; and l) constantly and seamlessly sending data during any time bounded vulnerability window, using said accumulated randomization.

* * * * *